(12) United States Patent
Thomas

(10) Patent No.: US 6,634,816 B2
(45) Date of Patent: Oct. 21, 2003

(54) KEY ASSEMBLY WITH A MULTIPLE FUNCTION KEY PROVIDING SELECTIVE ACTIVATION OF PLURAL SWITCHES

(75) Inventor: Paul A. Thomas, Binstead (GB)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/893,420

(22) Filed: Jun. 29, 2001

(65) Prior Publication Data

US 2002/0041784 A1 Apr. 11, 2002

(30) Foreign Application Priority Data

Jun. 30, 2000 (GB) .............................................. 0016241

(51) Int. Cl.[7] .................................................. B41J 5/28
(52) U.S. Cl. ........................................ 400/472; 400/490
(58) Field of Search ................................ 400/472, 481, 400/480, 485, 490; 200/5 A, 5 R

(56) References Cited

U.S. PATENT DOCUMENTS

| | | | | |
|---|---|---|---|---|
| 4,769,516 A | * | 9/1988 | Allen | 200/5 |
| 4,825,019 A | * | 4/1989 | Fisher | 200/6 |
| 4,975,547 A | * | 12/1990 | Nakayama et al. | 200/5 A |
| 5,883,346 A | * | 3/1999 | Stocken | 200/4 |
| 6,386,773 B1 | * | 5/2002 | Mathias | 400/485 |

FOREIGN PATENT DOCUMENTS

| | | | |
|---|---|---|---|
| FR | 2249419 | * | 10/1973 |
| GB | 2011725 | * | 7/1979 |
| GB | 2029106 | * | 3/1980 |
| GB | 2324414 | * | 10/1998 |

OTHER PUBLICATIONS

Smart Key, IBM Technical Disclosure bulletin, vol. 28, No. 5, Oct. 1985, oages 1859–1860.*

* cited by examiner

Primary Examiner—Andrew H. Hirshfeld
Assistant Examiner—Anthony H. Nguyen
(74) Attorney, Agent, or Firm—Antonelli, Terry, Stout & Kraus, LLP

(57) ABSTRACT

A key assembly for a keypad is disclosed. The key assembly is arranged to operate each of three switches. The key assembly has a key and pivot members which provide respective pivot axes about which the key is pivotable for operation of respective ones of the switches.

13 Claims, 5 Drawing Sheets

KEY ASSEMBLY WITH A MULTIPLE FUNCTION KEY PROVIDING SELECTIVE ACTIVATION OF PLURAL SWITCHES

BACKGROUND OF THE INVENTION

1. Field of the Invention

This invention relates to a key for a keypad. It finds particular, but not exclusive use in portable telecommunications devices such as portable telephones and wireless computers or digital assistants.

2. Description of the Prior Art

Most portable telephones and personal digital assistants (PDAs) require a keypad in order to allow a user to enter operational instructions. Portable telephones, in particular, normally require an alphanumeric keypad consisting of at least 10 keys corresponding to the digits 0 to 9. Two further keys carrying the legends # and * are normally provided also. In addition to these keys, however, it is normal practice to provide further keys corresponding to particular functions of the telephone. These may include on-hook and off-hook keys, and, additionally, menu, cursor (up/down and/or left/right), volume and select keys.

Portable telephones pose a particular problem in the area of user interface design. There is a customer demand to reduce the overall size of the telephone for ease of portability and storage, as well as a need for larger displays to facilitate the display of large amounts of data e.g. Internet browsing. These two factors combined have the effect of reducing the area available on the telephone to accommodate the keypad.

As the key pivots about protrusions 320a and 320b, the protrusions serve to mechanically isolate keydome switch 580a from neighbouring keydome switch 580c, which actuates the 'select' function. The key 180 and the protrusions 320a and 320b are a unitary structure. When the pressure is sufficient to distort keydome switch 580a, the protrusions 320a and 320b act to ensure that keydome switch 580c is not actuated.

Other devices which may be used to provide input control signals are roller balls or rotary switches. Like the joystick, these devices can be comparatively bulky, difficult to accommodate, difficult to back-light and hard to seal against ingress of dust and water.

SUMMARY OF THE INVENTION

According to a first aspect of the present invention there is provided a key assembly for a keypad, arranged to operate each of three switches, the key assembly comprising a key and pivot members disposed to provide respective pivot axes about which the key is pivotable for operation of respective ones of the switches.

Advantageously, a key assembly according to embodiments of the invention allows greater functionality to be incorporated into a smaller space than would be the case if individual keys were supplied for each function.

Preferably, the key assembly is used to provide navigational functionality for a portable telephone. The key may replace separate keys for any combination of up, down, left, right and select functions.

A key assembly according to embodiments of the invention allows a user to operate equipment comprising the key assembly such that mis-keyings are less likely to occur. This is due to the increased mechanical isolation between adjacent switches.

In a preferred embodiment, the user is able to pivot a key about a first axis to operate a first switch. The user is also able to pivot the key about a second, different axis to operate a second switch. Additionally, the user is able to operate a third switch by depressing the key such that it does not pivot. The different tactile experiences of each operation can preferably be enhanced through the use of different tactile materials on the surface of the key, or by providing raised/recessed portions.

In a preferred embodiment, a pivoting action of the key operates a first and second switch. A third switch is operated by depression of the key such that pivoting does not occur.

Preferably, the operation of the key to operate the third switch requires depression of the key in such a way that such depression can be considered as being a position between the two pivoted orientations required to operate the other switches.

In a preferred embodiment, pivoting is achieved through the provision of projections between individual switch actuators.

One of the switch actuators may be arranged to be larger than the other actuators, thus further decreasing the chance of inadvertently operating a neighbouring switch.

In a preferred embodiment, the two pivot axes are parallel.

There are many possible relative positions for the switches, but they may be arranged to be collinear.

Preferably, the key assembly forms part of a keypad for use in an electronic apparatus. The electronic apparatus may be a portable communication device such as mobile telephone, a wireless computer or organizer.

Embodiments of the invention provide a number of advantages over prior art solutions.

BRIEF DESCRIPTION OF THE DRAWINGS

For a better understanding of the present invention, and to understand how the same may be brought into effect, the invention will now be described, by way of example only, with reference to the appended drawings in which.

DETAILED DESCRIPTION OF THE PREFERRED EMBODIMENTS OF THE INVENTION

Figure 1:
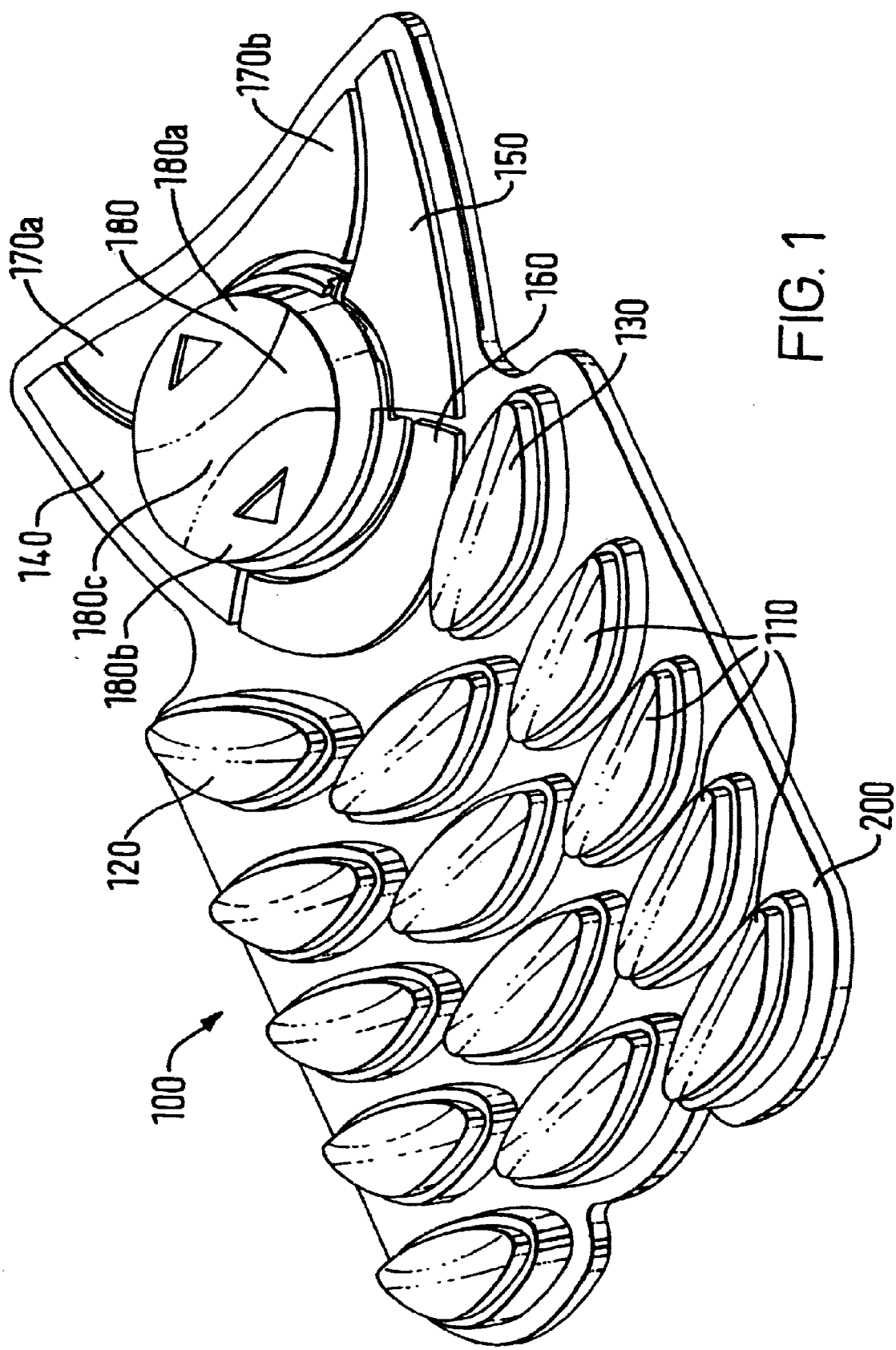
FIG. 1 shows a front perspective view of a keymat according to an embodiment of the invention.

Referring to FIG. 1, there is shown a perspective view of the front of a keymat 100 according to an embodiment of the invention. The keymat 100 comprises a flexible planar element 200, further comprising several keys. A suitable material for the keymat is a silicone rubber material. Integrally formed with the planar element 200 are several alphanumeric keys 110. The alphanumeric keys 110 comprise a single key for each number, 0 to 9, as well as a key each for * and #, as is customary. Also provided is an off-hook (or SEND) key 120, an on-hook (or END) key 130.

The keys at the upper end of the keymat are also integrally formed with the keymat and comprise various navigational, and special function keys. Keys 170a and 170b are soft-keys, whose function is dictated by the current status of the telephone. Labels are provided in the display of the telephone indicating the current function of the keys. They are physically accommodated in a single key, but each end of the soft-key is arranged to actuate a different switch mounted on the underlying circuit board. Key 160 is a dedicated key allowing one touch access to data services. For example, in the Japanese PDC system, this key may be used to select the so-called 'i-mode'. In other systems, this key could allow easy access to the Internet or World Wide Web (WWW).

Keys 140 and 150 are respectively 'left' and 'right' navigational keys, and are used to steer a cursor about the display. Alternatively, keys 140 and 150 may be used to scroll through a list of possible menu or other options on the display.

Key 180 is a navigation key comprising three separate functions. Regions 180a and 180b are used to select 'up' and 'down' functionality respectively. Region 180c corresponds to a 'select' region, and is used to select a menu item shown on the display, or to follow a link in a displayed WWW page of information. Key 180 may be considered to combine the functionality of three separate keys—'up', 'down' and 'select'—in one physical key.

It is common practice to combine the functionality of two keys into a single physical key. For instance, this is often done for scroll keys offering up and down regions. A particular problem arises when the functionality of three or more keys is incorporated into a single key as the key region positioned between other regions is likely to be inadvertently actuated by a user, particularly as the key dimensions become ever smaller.

Figure 2:
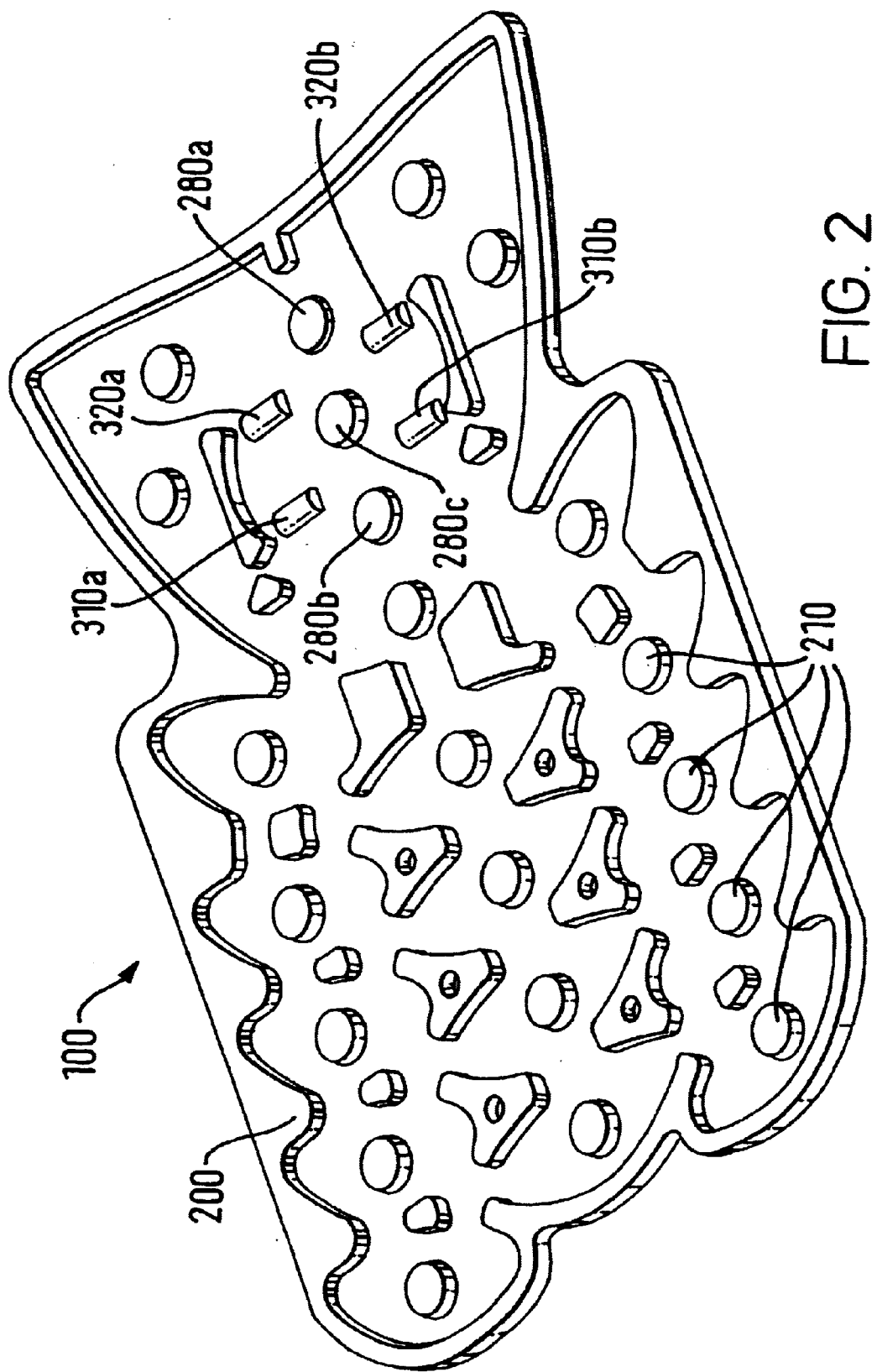
FIG. 2 shows a rear perspective view of a keymat according to an embodiment of the invention.

Referring to FIG. 2, it can be seen that for each key 110, there is a projection 210, which acts as a keydome actuator, positioned on the reverse side of the keymat in direct correspondence to a respective key on the upper surface of the keymat 100. Each keydome actuator is arranged to correspond with a keydome positioned above a circuit board arranged beneath the keymat 100. Each keydome is a hollow conductive partially hemispherical structure positioned above two non-connected conductive traces on the circuit board. A sheet of material comprising several keydomes is situated between the keymat and the PCB carrying the traces. When pressure is applied to key 110, keydome actuator 210 moves to contact the keydome. With increased pressure, the keydome is temporarily distorted. The conductive keydome thus provides a conductive path connecting the two previously non-connected traces. This change in connection status may be registered by a processor to detect a key press. When the pressure is released, the keydome springs back to its original state, and the connection is terminated. Thus, each key press triggers only a temporary actuation of its respective switch. The period of actuation corresponds to the period for which pressure is applied to the key.

The keymat is secured in place by a front cover of the telephone, as is well known in the art. This cover has an aperture corresponding to each key position, and ensures that the keymat is held securely against the circuit board and the sheet of keydomes.

The 3-way key 180 combines up and down scrolling, together with the functionality of a 'select' or 'enter key. The single key 180 comprises three regions, 180a, 180b and 180c, respectively associated with 'up', 'down' and 'select' functionality. Given the requirements already described, of the desire to miniaturize the keypads of portable telephones, it can clearly be seen that grouping the functionality of more than one key into a physical area tending towards that occupied by a single key, offers advantages to designers of portable telephones. Such a grouping also enhances the operability of the user-interface of the telephone, as the user is able to easily use the phone with a single hand, and reduces the need to look away from the display of the telephone. This is particularly desirable in the case where the user is accessing information via the WWW, and will not want to constantly look away from the screen to ensure that the correct key is being pressed.

Figure 3:
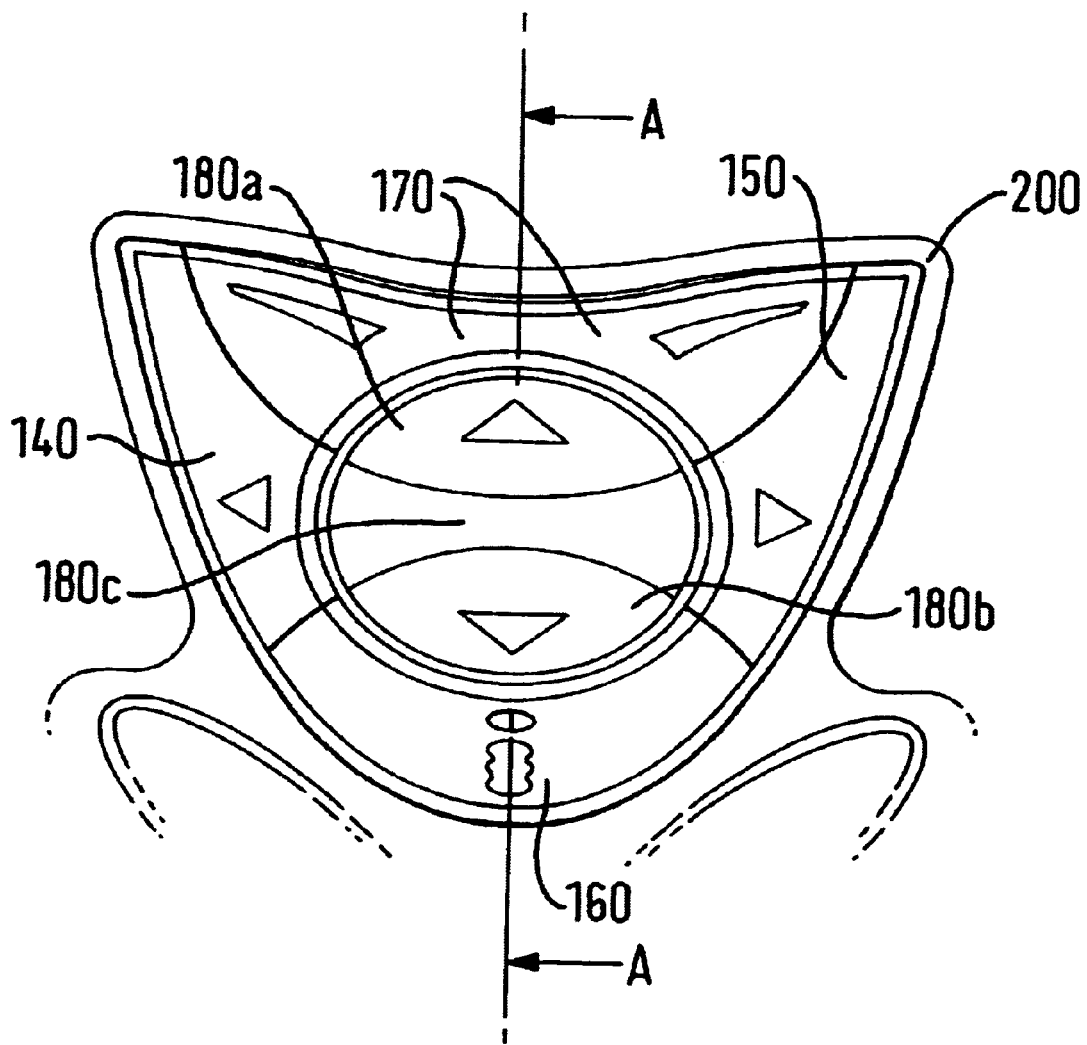
FIG. 3 shows a partial detailed view of the front of the keymat of FIGS. 1 and 2.
Figure 4:
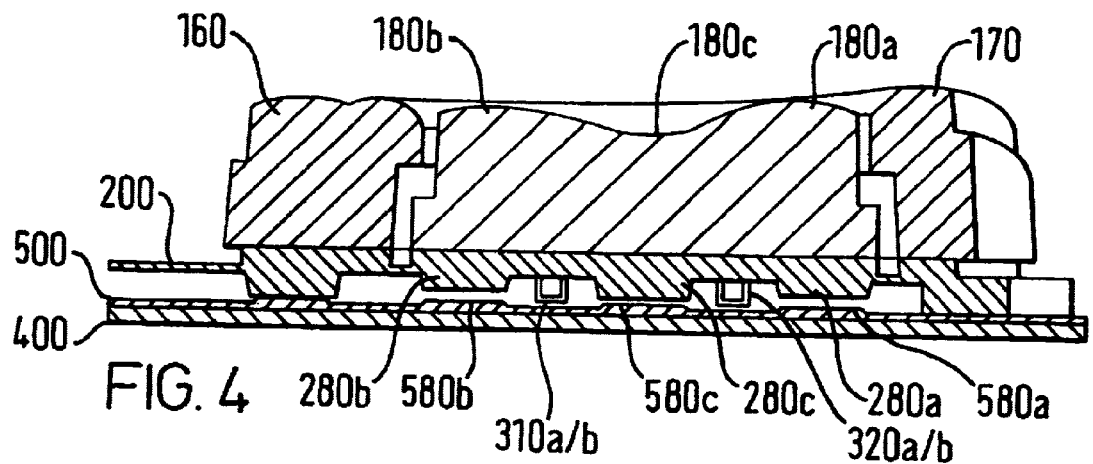
FIG. 4 shows a sectional view of the keymat of FIG. 3 along the line A—A, in position above a switch assembly of a portable telephone.

In order to describe the operation and structure of the multi-function key 180, reference will be made to FIGS. 3 and 4. FIG. 3 shows a detailed plan view of the top part of the keypad previously mentioned, including key 180. FIG. 4 shows a cross section through the keypad along line A—A of FIG. 3.

In order to understand the operation of the multi-function key, it is instructive to describe how the key may be used by a user of the telephone. Most portable telephones have a hierarchical menu structure, via which the user may access a particular function of the telephone. The user may move through the telephone's menu structure using the 'up' and 'down' regions 180a, 180b of key 180 until he arrives at the menu page of interest. To select this page, he must use the 'select' function, operated by region 180c of the multi-function key 180. This will normally lead to a further set of options which may need further navigation before the user comes across the feature of interest.

It can be seen from FIG. 4 that each region of the key 180 corresponding to up 180a, down 180b and select 180c has a corresponding keydome actuator, 280a, 280b and 280c respectively, on the underside of the keymat. FIG. 4 shows the keymat in position above keydome switches 580a, 580b and 580c. It can be seen that keydome actuator 280c extends further from the plane of the planar surface 200 than keydome actuators 280a and 280b, which are of equal size. That is, the keydome actuator 280c is closer to keydome switch 580c in its stable position than actuators 280a and 280b are to their respective keydome switches 580a and 580b.

FIG. 2 shows structures 310a, 310b, 320a and 320b which are located in the region of the keydome actuators 280a, 280b and 280c. Structures 310a and 310b are provided a short distance on either side of an imaginary line joining actuators 280b and 280c. Likewise, structures 320a and 320b are located a short distance either side of an imaginary line joining actuator 280c and 280a. Structures 310a, 310b, 320a and 320b are protrusions from the plane of the keymat, and their function can be understood by reference to FIG. 4.

Figure 5:
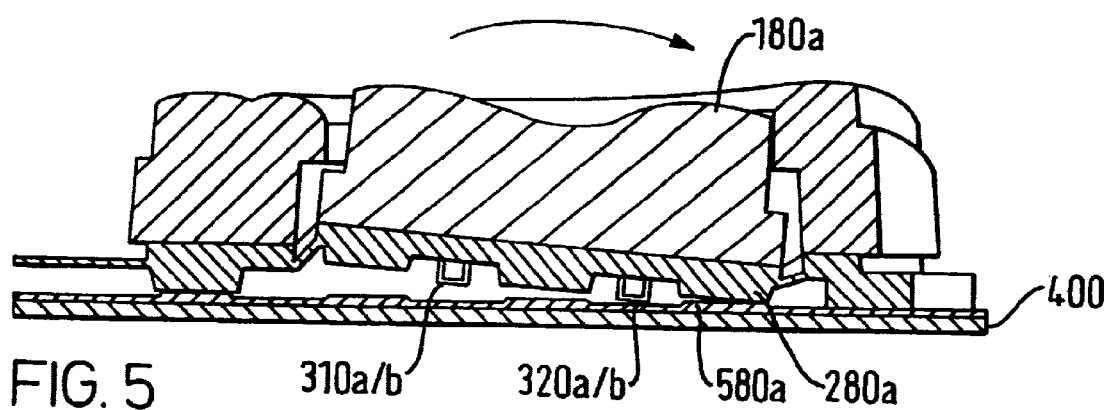
FIG. 5 shows the keypad assembly of FIG. 4 when used to actuate the 'up' keydome.
Figure 6:
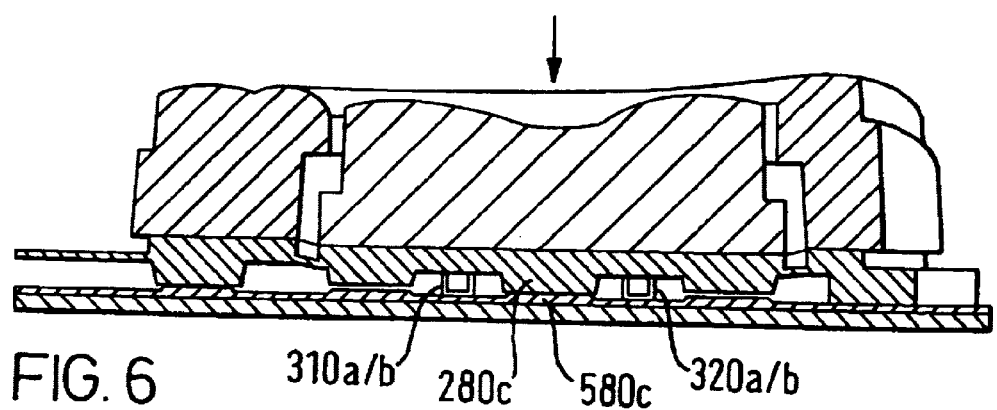
FIG. 6 shows the keypad assembly of FIG. 4 when used to actuate the 'select' keydome.

In FIGS. 4, 5 and 6, the protrusions 310a, 310b, 320a and 320b can be seen as non-shaded elements as they do not actually lie on the line A—A.

FIG. 5 shows the situation when the user selects the 'up' function by depressing region 180a of key 180. When finger or thumb pressure is applied to region 180a, the entire key 180 is caused to pivot about protrusions 320a and 320b. The applied pressure causes the top part 180a of the key 180 to travel downwards towards the PCB 400, and the lower part 180b of the key 180 to move relatively upwards.

As the key pivots about protrusions 320a and 320b, the protrusions serve to mechanically isolate keydome switch 580a from neighbouring keydome switch 580c, which actuates the 'select' function. The key 180 and protrusions 320a and 320b are a unitary structure. When the pressure is sufficient to distort keydome switch 580a, the protrusions 320a and 320b acto to ensure that keydome switch 580c is not actuated.

In the absence of the protrusion 320a and 320b, it can be seen that there is a likelihood that the pressure on region 180a may be transferred inadvertently to the central region 180c so as to actuate switch 580c. Such actuation of the 'select' key as well as, or instead of, the desired actuation of the 'up' key may result in the user initiating an unwanted function in the telephone.

The mode of operation of the 'down' function, initiated by depressing region 180b of key 180, is similar to that described for the 'up' function as described and shown in FIG. 5, except that the key 180 now pivots about protrusions 310a and 310b, which act to increase the mechanical isolation of keydome switch 580b from keydome switch 580c.

FIG. 6 shows the situation where the user applies pressure to region 180c to operate the 'select' function. As pressure is applied to region 180c, the movement of the key 180 downwards also causes the protrusions 310a, 310b, 320a and 320b to move downwards. As they contact the planar part of the sheet of keydomes 500, they act to increase the mechanical isolation of the central keydome 580c from the surrounding keydomes 580a and 580b. In this way, it is less likely that inadvertent actuation of the 'up' or 'down' functions will occur.

It can be seen that in the absence of protrusions 310a, 310b, 320a and 320b, there would be a tendency for pressure on region 180c to actuate keydomes 180a and/or 180b. The increased size of keydome actuator 280c in the direction perpendicular to the planar surface 200 also helps in ensuring that only keydome switch 580c is actuated when region 180c is depressed.

It can be seen that the multi-function key 180 is able to replace three separate keys which would otherwise be required.

The exterior surface of the keys, which protrude through the front cover of the telephone, are capped with a durable plastic enclosure bearing a suitable legend for each key. This provides for greater durability of the keypad over the life of the telephone, and permits customisation of colours and labels without altering the basic keymat.

In the embodiment described, the up and down regions, 180a and 180b, comprise portions which are raised slightly relative to the select region. This can be seen from FIGS. 4, 5 and 6. This enables the user to sense a tactile difference between the select area 180c and the up or down areas 180a, 180b of key 180.

Figure 7:
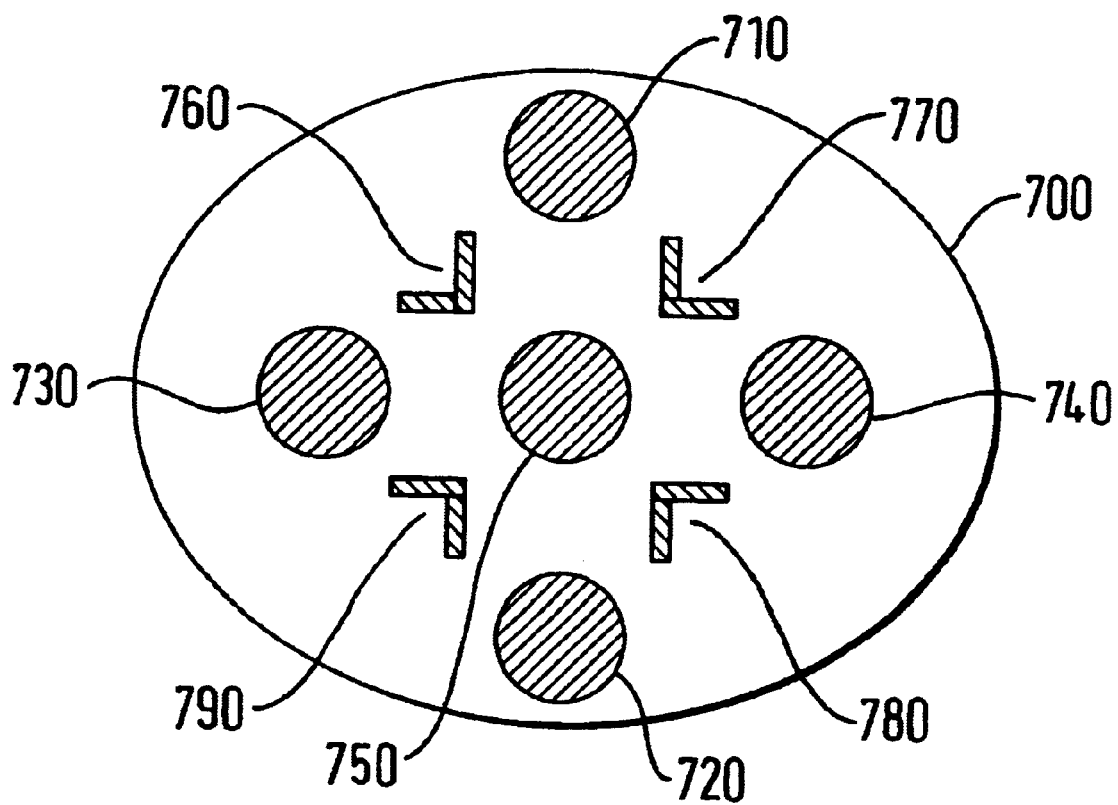
FIG. 7 shows an alternative embodiment of the invention having a key with 5 keydome actuators.

FIG. 7 shows an embodiment of the invention which demonstrates how a key can be constructed which is capable of combining the functionality of more than the three keys which have so far been described.

FIG. 7 shows a view of the underside of a key 700 which can be used to operate five separate switches. An example of the use that could be made of such a key is in providing complete navigational control for a cursor. In this case, 'up', 'down', 'left', 'right' and 'select' functionality can be combined in a single key.

The mode of operation of such a key is similar to that already described. The keydome actuators corresponding to the various navigation functions are: 'up' 710, 'down' 720, 'right' 730, 'left' 740 and 'select' 750. The structure of the key 700 can be considered to be combine two of the three-way keys already described. One can imagine a first key being superimposed on a second which has been rotated by 90°.

When the user wishes to move a cursor up the screen, the user applies pressure to the part of the key above actuator 710. In doing so, the key pivots about structures 760 and 770 in a manner already described. A summary of keydome actuator operation, together with pivot points used is shown in the table below:

| Function | Keydome actuator | Points under pressure |
| --- | --- | --- |
| Up | 710 | 760, 770 |
| Down | 720 | 780, 790 |
| Right | 730 | 760, 790 |
| Left | 740 | 770, 780 |
| Select | 750 | 760, 770, 780, 790 |

When the user presses the central part of key 700 to operate the 'select' function, the four surrounding pivot points serve to increase the mechanical isolation of the central actuator 750. This helps to ensure that only the 'select' function is operated, and that no other function is inadvertently operated.

In the light of the foregoing description, it will be clear to the skilled man that various modifications may be made within the scope of the invention.

The present invention includes any novel feature or combination of features disclosed herein either explicitly or any generalisation thereof irrespective of whether or not it relates to the claimed invention or mitigates any or all of the problems addressed.

What is claimed is:
1. A keypad comprising:
a key assembly comprising a flexible planar element including a plurality of keys with at least one multi-function key activating at least three switching functions;
a key mat having an undersurface, vertically aligned with the multifunction key, which has at least three spaced apart downwardly projecting actuators, including a central actuator and at least two outboard actuators;
a printed circuit board, including at least three spaced apart switches with a central switch and at least two outboard switches, which perform the at least three switching functions and which are aligned vertically with the downwardly projecting actuators and which are closed by contact aligned with one of the downwardly projecting actuators; and
at least a pair of pivots, disposed between the central actuator and the at least two outboard actuators, which space the at least three spaced apart downwardly projecting actuators apart from the at least three spaced apart switches so that downward pressure applied to the central actuator causes contact with the central switch and does not cause the at least two outboard actuators to contact the vertically aligned at least outboard switches and downward pressure applied to any one of the outboard actuators causes contact with the vertically aligned outboard switch and pivoting about an adjacent pivot which prevents any other of the switches from being closed.

2. A keypad in accordance with claim 1 wherein:
the at least two pivots project downward from the under surface and vertically below the actuators.

3. A keypad in accordance with claim 1 comprising:
two pivots and three switches.

4. A keypad in accordance with claim 2 comprising:
two pivots and three switches.

5. A keypad in accordance with claim 1 comprising:
four pivots and five switches.

6. A keypad in accordance with claim 2 comprising:
four pivots and five switches.

7. A keypad in accordance with claim 1 wherein:
the pivots provide two pivot axes such that the at least one multifunction key pivoting about one of the two pivot axes operates one of the outboard switches and the pivots support a position that downward movement of the at least one multifunction key operates the central switch.

8. A keypad in accordance with claim 1 wherein:
the key and the pivots are a unitary member.

9. A keypad in accordance with claim 7 wherein:
the pivot axes are parallel.

10. A keypad in accordance with claim 1 wherein:
the actuator for the central switch projects downward from the under surface more than the outboard actuators.

11. A keypad in accordance with claim 5 wherein:
the four pivots provide four pivot axes such that the at least one multifunction key pivoting about one of the pivot axes operates one of the four outboard switches and the pivots support a position that downward movement of the at least one multifunction key operates the central switch.

12. A keypad in accordance with claim 1 wherein:
the pivots are in a depression defined by the at least two outboard actuators and the central actuator.

13. A keypad as claimed in claim 1 wherein the at least a pair of pivots provide two-pivot axes and the two pivot axes are parallel.

* * * * *